United States Patent

[11] 3,573,485

[72] Inventor Delbert L. Ballard
9352 Van Alden, Northridge, Calif. 91324
[21] Appl. No. 739,436
[22] Filed June 24, 1968
[45] Patented Apr. 6, 1971

[54] COMPUTER MEMORY STORAGE DEVICE
12 Claims, 12 Drawing Figs.

[52] U.S. Cl. 307/88, 307/238, 307/282, 340/173.2, 340/174
[51] Int. Cl. G11c 11/02, G11c 11/22, H03k 17/80
[50] Field of Search 307/88, 238, 232; 340/173.2, 174

[56] References Cited
UNITED STATES PATENTS

| | | | |
|---|---|---|---|
| 3,418,646 | 12/1968 | Marcus | 340/174 |
| 3,427,601 | 2/1969 | Korkowski et al. | 340/174 |
| 3,284,782 | 11/1966 | Burns | 340/173 |
| 2,845,611 | 7/1958 | Williams | 340/174 |

*Primary Examiner*—James W. Moffitt
*Attorney*—Sokolski and Wohlgemuth

ABSTRACT: A flip-flop circuit is formed with a pair of active electronic-switching elements. Connected in circuit with at least one of these switching elements as an impedance coupler is a passive storage element. A digital signal to be stored is written into the passive storage element, thereby changing its effective impedance in the circuit. The readout signal is obtained from the electronic-switching elements by providing power to such active switching elements in response to a readout address, the electronic-switching elements assuming a conductive or nonconductive state in accordance with the effective circuit impedance of the associated passive storage element.

INVENTOR.
DELBERT L. BALLARD

BY SOKOLSKI & WOHLGEMUTH

ATTORNEYS

INVENTOR.
DELBERT L. BALLARD
BY SOKOLSKI & WOHLGEMUTH
ATTORNEYS

*INVENTOR.*
DELBERT L. BALLARD

BY SOKOLSKI & WOHLGEMUTH

ATTORNEYS

INVENTOR
DELBERT L. BALLARD
BY SOKOLSKI & WOHLGEMUTH
ATTORNEYS

COMPUTER MEMORY STORAGE DEVICE

This invention relates to digital computer memory devices and more particularly to such a device utilizing a flip-flop circuit in conjunction with a passive storage device.

In digital computer techniques, passive storage devices, which may be of the ferromagnetic or ferroelectric variety, are widely utilized to store digital information. This type of device while having the inherent advantages of compact construction and the lack of power consumption, has a disadvantage in that readout generally is destructive, i.e., erases the stored information. Further, passive memory elements of this type provide very low output signals which must be amplified for proper utilization. In circuits designed for nondestructive readout the further diminution of the output signal is a major problem.

To provide a memory without these shortcomings it has been suggested that memory cells be formed from active elements arranged in a flip-flop configuration. Such a system is described, for example, in U.S. Pat. No. 3,284,782. A memory storage system utilizing active flip-flop elements, however, has the disadvantage of power dissipation with its undesirable heating effects. Further, with this type of memory element, the stored information is lost if there should be a loss of power, even if such power loss is but momentary. Still further, the information stored in an active memory element can be destroyed under high density ionizing radiation. This last factor, of course, is particularly significant where the equipment is likely to be operated under conditions of high radiation, such as, for example, in space or nuclear radiation applications.

The device of this invention combines the inherent advantages of passive and active storage elements providing the advantages of an active flip-flop memory such as relatively high signal output and nondestruction by readout but, as for a passage storage system, without involving any significant power dissipation or being subject to loss of information with a loss of power or under high radiation conditions.

The device of the invention utilizes a pair of active electronic-switching elements connected in a flip-flop configuration. A passive memory element is connected in circuit with at least one of the active switching elements so that it is capable of affecting the switching action of its associated element. Switching means are provided to control the application of power to the active switching elements. The electronic-switching elements are deactivated at all times except during readout. Information to be stored is written into the passive storage element or elements in either of two opposite polarities. Readout is obtained by activating the switching means to connect power to the active switching elements. When such readout switching occurs, the passive storage element associated with one flip-flop switching element provides a low impedance current path to the switching signal. Therefore, the flip-flop switch associated with the low impedance element will go to the conductive state, while the other flip-flop switch will go to cutoff. The invention will now be described in connection with the drawings of which:

Figure 1:
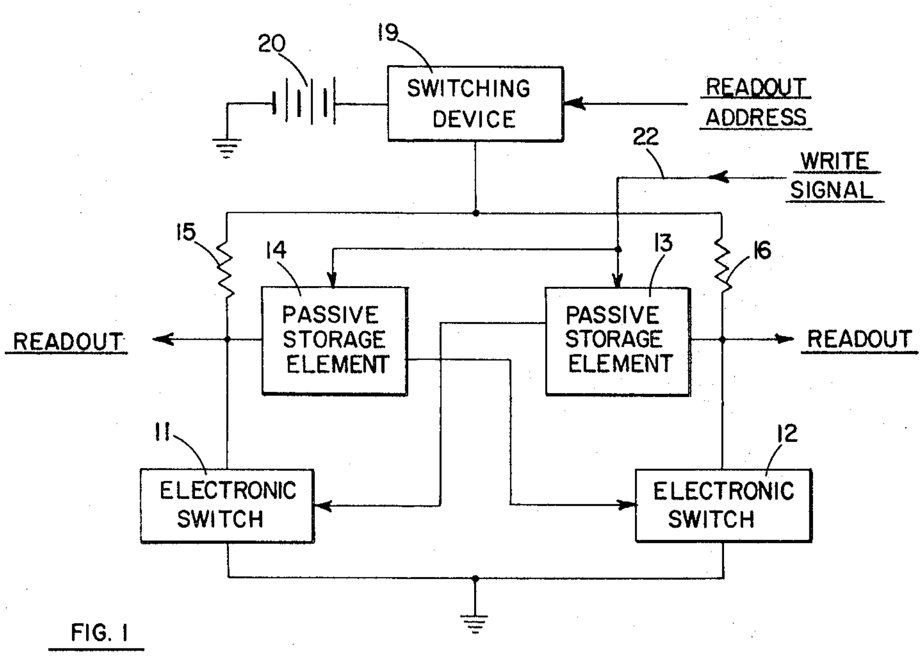
FIG. 1 is a functional schematic of a first embodiment of the device of the invention.
Figures 9, 10:
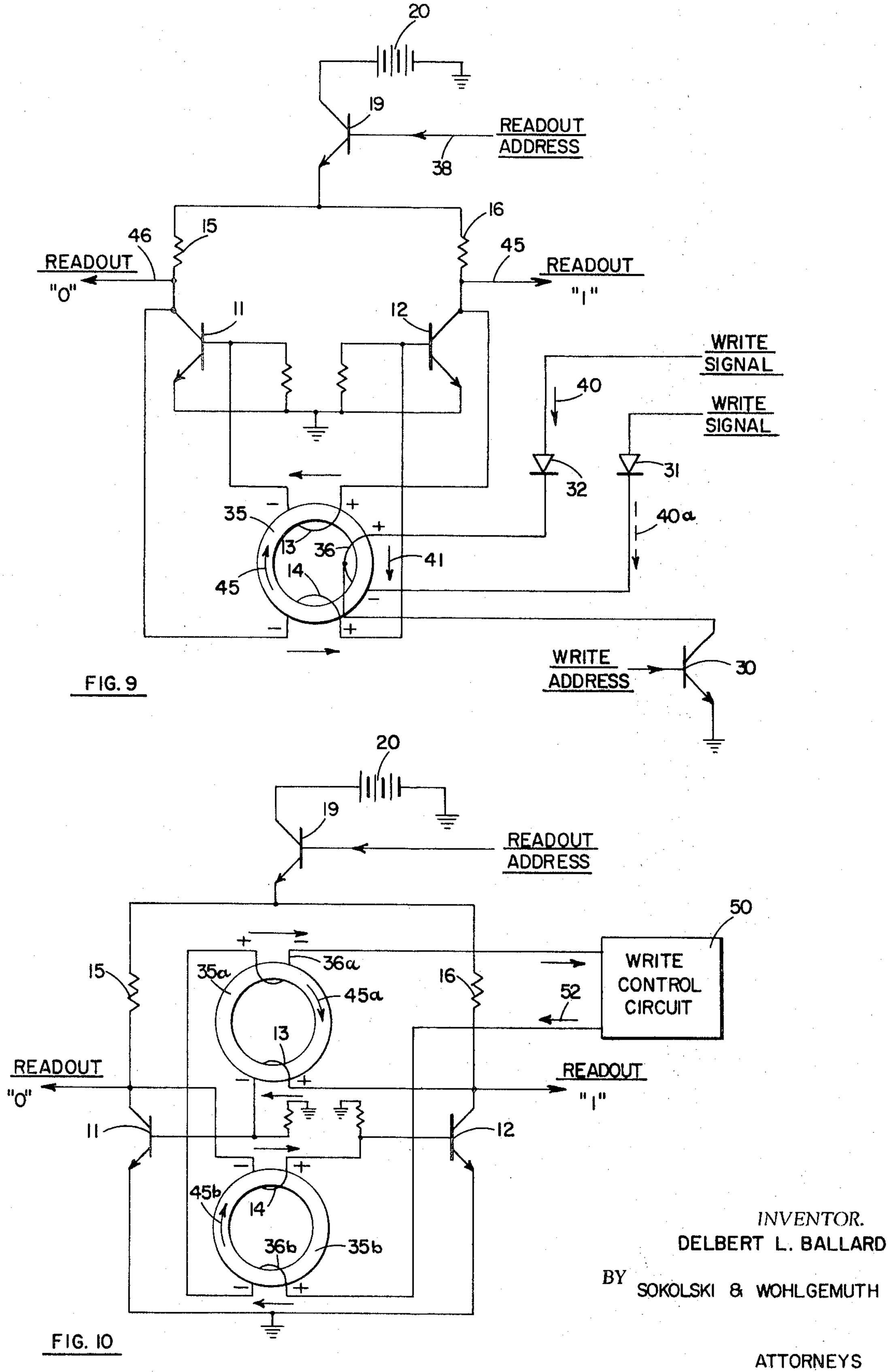
Figure 11:
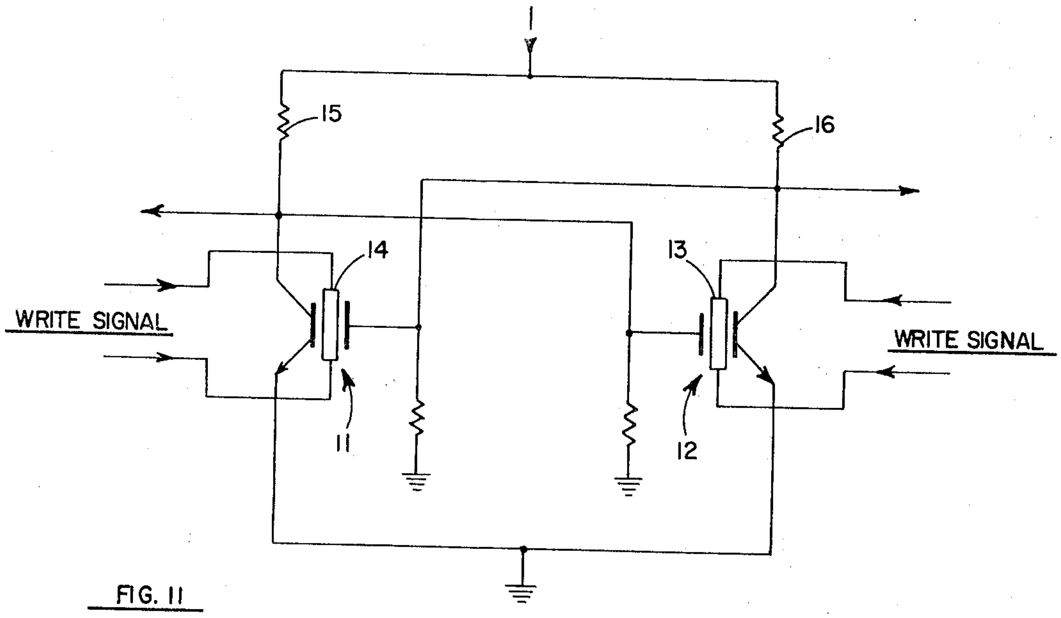
Figure 12:
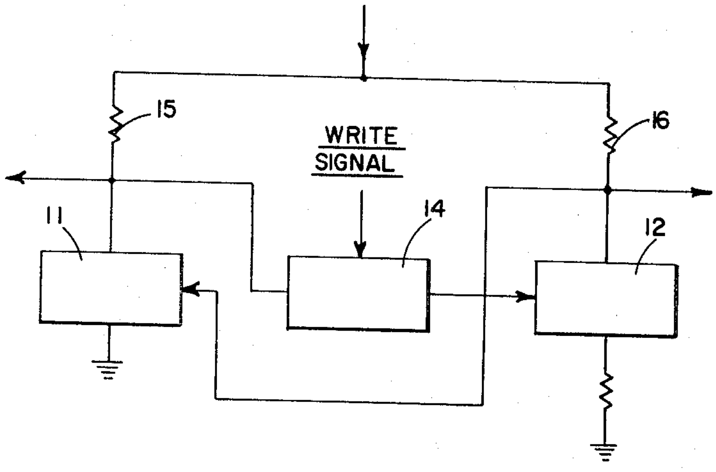

FIG. 9 is a schematic drawing illustrating in detail a first circuit in accordance with the embodiment of FIG. 1, FIG. 10 is a schematic diagram illustrating the details of a second circuit in accordance with the embodiment of FIG. 1, FIG. 11 is a schematic diagram illustrating a further embodiment of the device of the invention in which the functions of the passive and active storage elements are combined in a specially constructed field effect transistor; and FIG. 12 is a schematic diagram illustrating another embodiment of the device of the invention utilizing a single passive storage element in conjunction with a preferentially biased flip-flop.

Referring now to FIG. 1, a first embodiment of the device of the invention is illustrated in functional schematic form. Electronic switches 11 and 12 are connected in a flip-flop configuration with passive storage elements 13 and 14 providing cross-coupling between the flip-flop stages. Electronic switches 11 and 12 may comprise semiconductor devices such as transistors, unijunctions, vacuum tubes, or any electronic-switching elements adaptable for use in conventional flip-flop circuitry. Passive storage elements 13 and 14 may be ferromagnetic memory elements as illustrated in FIGS. 9 and 10, ferroelectric elements, or any such passive devices capable of storing an electrical signal which will provide an electrical impedance which is a function of the polarity of the signal stored therein.

A "write" signal is fed to passive storage elements 13 and 14 on line 22 to provide a stored signal in each of the passive storage elements, these stored signals being in opposite polarities i.e., for example, when the terminal of passive storage element 13 connected to electronic switch 12 is negative, the terminal of passive storage element 14 connected to electronic switch 11 is positive, and vice versa.

Readout is accomplished by feeding a readout address signal to switching device 19 thereby actuating the switching device and providing power from power source 20 through the switching device and resistors 15 and 16 to electronic switches 11 and 12 respectively. It is to be noted that except at such times as switching device 19 is being actuated by a readout address signal, electronic switches 11 and 12 have no power applied thereto and are deactivated. The flip-flop elements thus are energized only during the short period of time that the readout signal is present, which normally is a period of time of the order of a fraction of a microsecond. The electronic switches thus under normal operating conditions have negligible power dissipation.

The device operates as follows: With electronic switches 11 and 12 deactivated, the signal to be stored is written into passive storage elements 13 and 14. As already indicated, this signal is written into passive storage element 13 in an opposite polarity to that of the signal written into passive storage element 14. As to be explained in connection with FIGS. 9 and 10, "write" signals can alternatively be written into passive storage elements 13 and 14 with one relative polarity or an opposite relative polarity to represent either a 1 or 0 digital signal. Let us assume, for example, that a "write" signal is written into passive storage elements 13 and 14 with a positive polarity on the side of passive storage element 13 connected to electronic switch 12, and a negative polarity on the side of passive storage element 13 connected to electronic switch 11; and with a positive polarity on the side of passive storage element 14 connected to electronic switch 12 and a negative polarity on the side of passive storage element 14 connected to electronic switch 11. Under such conditions, when the readout address causes switching device 19 to be activated, a positive potential is applied through resistors 15 and 16 across electronic switches 11 and 12 respectively. Passive storage element 13, as noted by way of example, has a positive potential at its point of connection to resistor 16. Thus, as to be explained more fully in connection with FIGS. 9 and 10, storage element 13 provides a low impedance path for the pulse of current from power source 20 through resistor 16 to the switching control element of electronic switch 11. Passive storage element 14, on the other hand, presents a high impedance path between the power source and the control element of electronic switch 11 in view of the fact that the stored signal therein presents a polarity that opposes the flow of current therethrough from the power source 20 to electronic switch 11.

Thus, with the actuation of switching device 19, a positive drive signal will be rapidly coupled through passive storage element 13 to electronic switch 11 while the passage of any such drive signal through passive storage element 14 to electronic switch 12 will be impeded and effectively delayed. Under such circumstances, electronic switch 11 will rapidly go to conduction and provide cross-coupling through passive storage element 14 to electronic switch 12 to drive switch 12 to cutoff. It should be apparent that conversely electronic switch 12 will go to conduction and electronic switch 11 to cutoff if the polarity of the "write" signal is reversed to provide a polarity of the stored signals in the storage element opposite from that just described.

Thus, in effect, one electronic switch or the other is given a predisposition to go to the conductive state when switching device 19 is actuated, this predisposition being determined by the polarity in which the signal is written into the storage elements. This predisposition is a function of the impedance to the change in current flow with the closure of the switching device, the time constant of the cross-coupling circuits being a function of such impedance.

Figure 2:
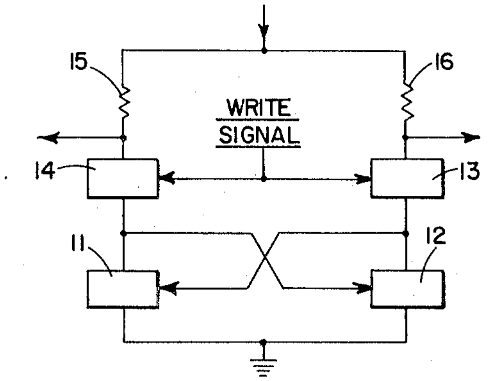
FIG. 2 is a functional schematic of a second embodiment of the device of the invention.

Referring now to FIG. 2, a second embodiment of the device of the invention is illustrated. This embodiment is similar to the first except for the fact that passive storage elements 13 and 14, rather than being connected in the cross-coupling between flip-flop stages 11 and 12, are connected between load resistors 15 and 16 and electronic switches 11 and 12 respectively. The storage elements, however, operate in the same manner as described to provide an impedance which is a function of the write signal stored in the passive storage elements, such impedance effecting the conduction of either flip-flop stage 11 or 12, as the case may be. Switching device 19 and power source 20 and the readout address are not illustrated for this embodiment or the embodiments shown in FIGS. 3—8 as they are identically connected as shown in FIG. 1.

Figure 3:
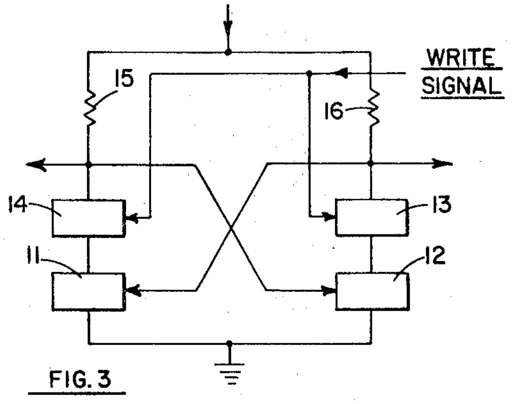
FIG. 3 is a functional schematic of a third embodiment of the device of the invention.

Referring now to FIG. 3, a third embodiment of the invention is illustrated. This embodiment again operates in the same general fashion as described, except that the cross-coupling signals between the electronic switches 11 and 12 are taken from the junction point between resistors 15 and 16 and the storage elements 14 and 13 respectively, rather than directly from the flip-flop switches, as in the embodiment of FIG. 2. Operation otherwise is closely similar to that described in connection with the other embodiments.

Figure 4:
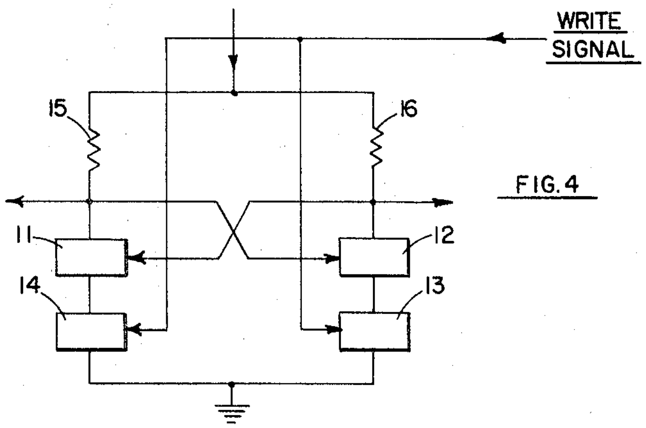
FIG. 4 is a functional schematic of a fourth embodiment of the device of the invention.

Referring now to FIG. 4, a fourth embodiment of the device of the invention is illustrated. In this embodiment, passive storage elements 13 and 14 are connected in the current path between the flip-flop switching elements 12 and 11 and ground. In this manner, either one or the other of the electronic switches will reach conduction, depending upon the effective impedance provided by its associated storage element in the same manner as described for the previous embodiments.

Figure 5:
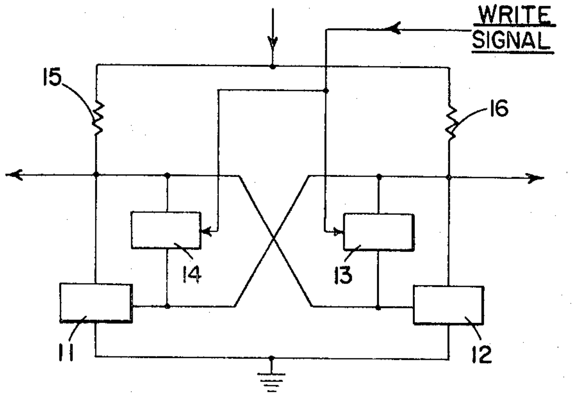
FIG. 5 is a functional schematic of a fifth embodiment of the device of the invention.

Referring now to FIG. 5, a further embodiment of the device of the invention is illustrated. This particular embodiment is generally not suitable for use with ferromagnetic storage devices which would provide low impedance DC current paths across the electronic switches and is primarily designed for use with storage elements not having such low DC impedance, such as for example ferroelectric elements. This particular circuit would be suitable for use with a ferroelectric storage device comprising a piezoelectric substance, such as barium titanate as described, for example, in U.S. Pat. No. 2,717,372. In this device, signals of opposite polarity are written into storage devices 13 and 14 in the same general fashion as described in connection with the previous embodiments, the ferroelectric device being polarized in accordance with the polarity of the "write" signal to furnish a circuit impedance in accordance with this polarization; thus providing a predisposition for either one or the other of the electronic switches to go to conduction when the readout address signal appears.

Figure 6:
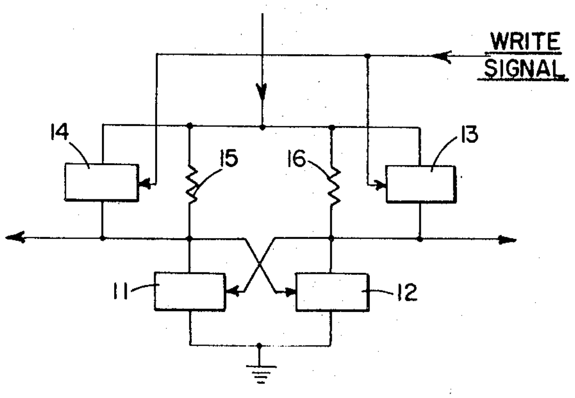
FIG. 6 is a functional schematic of a sixth embodiment of the device of the invention.

Referring now to FIG. 6, a further embodiment of the device of the invention is illustrated. In this embodiment it is to be noted that the passive storage elements 13 and 14 are connected in shunt with load resistors 16 and 15 respectively. This embodiment as for the embodiment of FIG. 5 thus is not suited for utilization where the storage elements have a low DC impedance, and is particularly adapted for utilization with ferroelectric type storage elements. The storage elements 13 and 14 of FIG. 6 operate in the same general fashion as described in connection with FIG. 5 to provide a low impedance current path to either electronic switch 11 or electronic switch 12, as the case may be, to cause one of these switches to go to conduction with the other going to cutoff.

Figure 7:
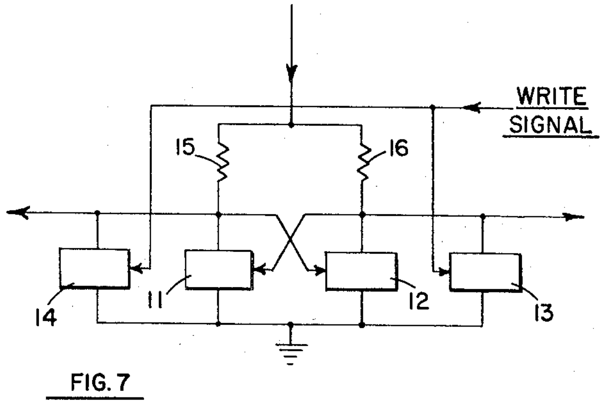
FIG. 7 is a functional schematic of a seventh embodiment of the device of the invention.

Referring now to FIG. 7, it can be seen that storage elements 13 and 14 are connected in parallel with electronic switches 12 and 11 respectively. Thus, here again, this embodiment is only suitable for use with storage elements having high impedance to DC, such as ferroelectric elements. As before, it can readily be seen that one or the other of the electronic switches 11 or 12 will go to the conductive state in accordance with the polarization of the associated storage element as established by the "write" signal.

Figure 8:
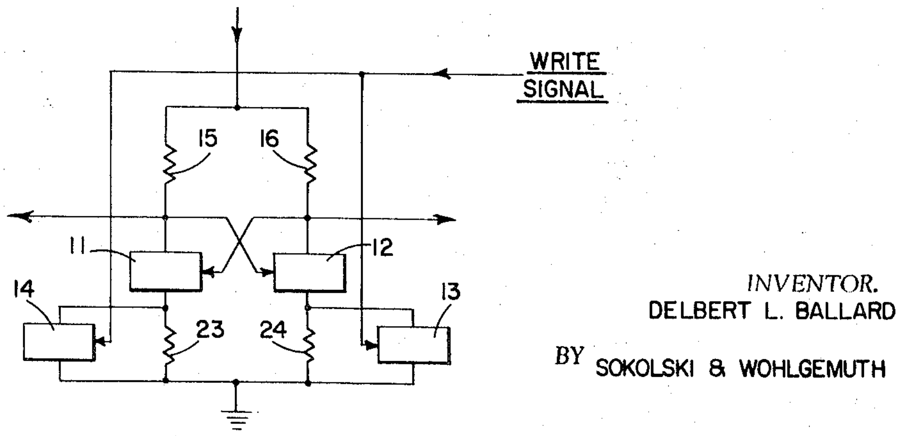
FIG. 8 is a functional schematic of an eighth embodiment of the device of the invention.

Referring now to FIG. 8, a further embodiment of the device of the invention suitable for utilization only with storage elements having high impedance to DC is shown. In this embodiment the storage elements 13 and 14 are connected in parallel with resistors 24 and 23 which are connected between the electronic switches 11 and 12 and ground. Again, as for the previous embodiments, one or the other of the electronic switches will go to the conductive state in accordance with the polarization of the associated storage element.

It is to be noted that each of the circuits shown in FIGS. 2—8 will include a power source 20, a switching device 19, and will operate in response to a readout address signal, as shown in FIG. 1, this identical circuitry being eliminated in these figures to facilitate the illustration thereof.

It is further to be noted that in connection with all of the embodiments, the electronic switches 11 and 12 are deactivated and thus nonconductive at all times except when a readout address signal is applied to switching device 19. However, by virtue of the signal stored in passive storage elements 13 and 14, in response to the "write" signal, the electronic switches will always assume the same conduction and nonconduction states, i.e., in accordance with the polarity of the signals in the storage elements when the readout address arrives.

Readout signals representing 1 and 0 digital signals are taken from the electronic switches 11 and 12 forming the flip-flop in conventional fashion as indicated. These signals, however, are obviously only present during the readout address. The flip-flop formed by the electronic switches thus is activated only during the fraction of a microsecond period during which the readout address is present, and therefore involves but a minute amount of power consumption. On the other hand, the "write" signals which are stored in the passive storage element are not destroyed should there be a power failure or high-level radiation signals present, nor is any destruction of such stored signals effected with readout.

Referring now to FIG. 9, a first detailed circuit in accordance with the embodiment of FIG. 1, in which the passive storage elements are located in the cross-coupling between the flip-flop stages, is illustrated. Transistors 11 and 12 form the electronic-switching elements of the flip-flop and have their collectors connected through load resistors 15 and 16 respectively to the emitter of transistor 19 which operates as a switching device in response to the readout address signal fed thereto on line 38. The positive terminal of power source 20 is connected to the collector of transistor 19, and thus, power is fed through transistor 19 to activate the flip-flop whenever a readout address signal is present on line 38 to the base of transistor 19, and only at such times.

The collector of transistor 12 is coupled to the base of transistor 11 through winding 13 while the collector of transistor 11 is coupled to the base of transistor 12 through winding 14. Windings 13 and 14 are wound on toroidal magnetic memory core 35. Magnetic memory core 35 may be a conventional ferromagnetic core as is widely used in the computer art. A "write" winding 36 is also provided on core 35 and receives a "write" current signal either through diode 32 or diode 31. Transistor 30 provides a "write" control switch for the "write" address signal. The circuit operates as follows:

For the purposes of illustration, let us assume that a "write" signal is fed to winding 36 through diode 32 in the direction indicated by arrow 40. This signal passes through one-half of winding 36 in the direction indicated by arrow 41, and thence through transistor 30 when this transistor is activated by means of a "write" address control signal fed to the base thereof. The current signal in the direction of arrow 41 having the indicated polarity causes magnetic flux in core 35 in the direction indicated by arrows 45. The magnetization of core 35 in the direction indicated by arrow 45 remains and is effectively stored in the core after the current signal indicated by arrow 40 disappears. Up until this time in the absence of any readout address signal on line 38, transistor 19 is deactivated and no current is drawn from power source 20 by flip-flop stages 11 and 12. When a readout address signal arrives on line 38, transistor 19 is activated in response thereto, providing a current path to the flip-flop. The positive pulse of current generated with the activation of transistor 19 sees a low impedance path through winding 13 due to the aiding current path through this winding established by virtue of the flux direction established in core 35. A positive current pulse thus will be rapidly transmitted from the collector of transistor 12 to the base of transistor 11. On the other hand, the current path provided through winding 14 opposes the coupling of the current pulse from the collector of transistor 11 to the base of transistor 12 because of the polarity opposition presented by virtue of the flux in the core, (as indicated in the FIG.) thereby providing a high impedance path to such current pulse and delaying its passage. Under such conditions, it should be apparent that transistor 11 will be rapidly driven to conduction, bringing transistor 12 to the cutoff condition by virtue of the flip-flop cross coupling. It can readily be seen that an opposite state of affairs can be achieved by providing a "write" signal through diode 31 in the direction indicated by dotted arrow **40*a*, in which case the directions of current and flux flow as indicated by the arrows will be reversed and transistor 12 will go to the conductive state when the readout address is present. Thus, where a "write" signal has been stored in the memory storage element in response to a current in the direction indicated by arrow 40, transistor 11 will be driven to conduction and transistor 12 to cutoff when the readout address signal arrives on line 38, providing a 1 readout on line 45 and a 0 readout on line 46; an opposite readout condition being provided in the event of a "write" signal in the direction indicated by arrow 40*a***.

Referring now to FIG. 10, a second embodiment of the device of the invention is illustrated. This embodiment is closely similar to that of FIG. 9, except for the fact that separate cores **35*a* and 35*b* are utilized for the storage elements in the flip-flop cross-coupling circuits. For illustrative purposes, the current flow is shown for a "write" control signal in the direction indicated by arrow 52. Such a "write" signal flows through write windings 36*b* and 36*a* in the indicated directions, and induces a flux in cores 35*a* and 35*b* in the directions indicated by arrows 45*a* and 45*b* respectively. As for the previous embodiment, this results in a flux linkage to winding 13 which tends to aid the pulse current flow from the collector of transistor 12 to the base of transistor 11 when transistor 19 is activated in response to the readout address. The flux linkage provided in core 35*b* to winding 14, on the other hand, opposes the pulse current flow from the collector of transistor 11 to the base of transistor 12. As already described in connection with FIG. 9, this in effect provides a low impedance path from the collector of transistor 12 to the base of transistor 11 providing a rapid current flow therebetween and delays the current pulse between the collector of transistor 11 and the base of transistor 12. Thus, as before, under these conditions transistor 11 will be driven to conduction with transistor 12 going to cutoff. Also, as previously described, converse storage and flip-flop conduction conditions will occur with the current flow opposite to that indicated by arrow 52**.

Referring now to FIG. 11, a further embodiment of the device of the invention in which the functions of the passive and active storage elements are combined in a specially constructed field effect transistor is illustrated. Field effect transistors 11 and 12 are constructed with their dielectric portions 14 and 13 fabricated of a ferroelectric material such as barium titanate. They are otherwise conventional in their construction. The field effect transistors 11 and 12 are connected in a flip-flop configuration. Write signals are written into dielectric portions 13 and 14 in either one polarity or the other, the polarity of the signal stored in dielectric portion 13 at any time being opposite to that stored in dielectric portion 14. Depending on the relative polarities of the write signals, either field effect transistor 11 or field effect transistor 12 will be given a predisposition to go to the conductive state when power is applied to the flip-flop circuit, in the manner described in connection with the previous embodiments. Thus, dielectric portions 13 and 14 provide the function of passive storage elements serving to cause preferential conduction of either one or the other of the flip-flop switches, this in accordance with the polarities of the stored signals. The circuit of FIG. 11 may be connected to a power source through a switching device in the same manner as shown in FIG. 1.

Referring now to FIG. 12, another embodiment of the invention is illustrated, this embodiment utilizing a single passive storage element 14 in conjunction with a preferentially biased flip-flop. The flip-flop circuit is formed by active switching elements 11 and 12 which may comprise transistors. Switching element 11, however, is biased differently from switching element 12 so that in the absence of a write signal to passive storage element 14, or when a 0 write signal is present, switching element 11 will go to conduction and switching element 12 will go to cutoff when power is applied to the circuit. Passive storage element 14 may comprise a ferromagnetic device as described in connection with previous embodiments, with a write signal fed thereto as previously described. Further, power may be fed to the flip-flop circuit and a readout signal taken therefrom in the same manner as described in connection with the embodiment of FIG. 1. Thus, when a 1 write signal is fed to passive storage element 14, this will provide a potential across passive storage element 14 so as to transform this passive storage element into a low impedance coupling element between switch 11 and the switching electrode of switch 12. This will cause switch 12 to go to conduction and switch 11 to go to cutoff when power is applied to the circuit. On the other hand, when the write signal to passive storage element 14 is 0, passive storage element 14 will present a relatively high impedance to the circuit, so that when power is applied thereto, switch 11 will go to conduction and switch 12 to cutoff by virtue of the preferential biasing. It thus can be seen that with this type of preferentially biased flip-flop circuit, the storage and readout functions can be accomplished with a single passive storage element. This circuit also lends itself to microminiaturization in that it utilizes less parts and thus is capable of more compact construction.

I claim:

1. In a flip-flop circuit, said flip-flop circuit comprising a pair of electronic switches;
   - passive storage element means connected to provide a flip-flop cross-coupling path between said switches;
   - a power source for providing current to said switches, said storage element means not being in series with the switch current path between said power source and said switches;

means for providing a signal to be stored to said storage element means;

a switching device interposed between said power source and said electronic switches;

means for providing a readout signal to said switching device to activate one of said electronic switches at a time to cause current flow therethrough from said power source in response to said signal, said current flow not passing through said storage element means; and whereby a particular one of said switches is activated in accordance with the polarity of said stored signal and said storage element means can store a signal independently of the activation of said switches.

2. The circuit of claim 1 wherein a storage element is connected in circuit with each of said switches and said signal is stored in said elements in opposite polarity relationship.

3. The circuit of claim 1 wherein said storage elements comprise at least one ferromagnetic storage member.

4. The circuit of claim 1 wherein said storage elements comprise a single magnetic core having a write winding and first and second storage windings, said storage windings forming the storage elements in conjunction with said core.

5. The circuit of claim 1 wherein said storage elements comprise separate magnetic cores, each of said cores having a separate write winding and storage winding thereon.

6. The circuit of claim 1 wherein said storage elements comprise ferroelectric storage devices.

7. The circuit of claim 1 wherein said flip-flop is biased so that it is preferentially stable, and said passive storage element means comprises a storage element connected between said switches.

8. The circuit of claim 1 wherein said electronic switches comprise a field effect transistors having dielectric layers formed of ferroelectric material, said dielectric layers forming passive storage elements.

9. A memory storage device comprising:

a pair of electronic switches connected in a flip-flop configuration;

a passive storage element connected in circuit with each of said switches in symmetrical fashion, each of said storage elements forming an impedance in a current path of its associated switch;

means for providing a write signal from an external source directly to both of said storage elements, a signal being stored in one of said storage elements in a polarity opposite to that stored in the other of said storage elements;

a power source;

switching means interposed between said power source and said electronic switches;

means for providing a readout address signal to said switching means to cause the activation thereof and provide power therethrough from said power source to activate said flip-flop; and whereby one or the other of said flip-flop switches will be activated in accordance with polarities of the signals stored in said passive storage elements.

10. The device of claim 9 wherein said storage elements are connected between the switches to provide the flip-flop cross-coupling circuits.

11. The device of claim 10 wherein said switches comprise transistors.

12. The device of claim 10 wherein said storage elements comprise ferroelectric storage devices.